United States Patent
Salge et al.

(10) Patent No.: US 6,624,352 B2
(45) Date of Patent: Sep. 23, 2003

(54) GIS POST INSULATOR WITH AN INTEGRATED BARRIER

(75) Inventors: Gerhard Salge, Stein (CH); Marco Piemontesi, Biasca (CH); Christoph Heitz, Elgg (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 10/282,099

(22) Filed: Oct. 29, 2002

(65) Prior Publication Data

US 2003/0079906 A1 May 1, 2003

(30) Foreign Application Priority Data

Oct. 29, 2001 (EP) .............................. 01811053

(51) Int. Cl.$^7$ ................................ H01B 9/06
(52) U.S. Cl. .................. 174/28; 174/21 C; 174/212
(58) Field of Search .................. 174/13, 15.4, 15.5, 174/17 GF, 21 C, 22 C, 25 R, 26 G, 28, 212

(56) References Cited

U.S. PATENT DOCUMENTS

| | | | | |
|---|---|---|---|---|
| 4,074,064 A | * | 2/1978 | Muller et al. ................... | 174/28 |
| 4,081,599 A | * | 3/1978 | Cookson .................... | 174/21 C |
| 4,338,483 A | * | 7/1982 | Euvrard et al. ................. | 174/28 |
| 4,564,721 A | * | 1/1986 | Ishikawa et al. ............... | 174/10 |
| 4,761,301 A | * | 8/1988 | Ellenberger et al. ......... | 174/212 |
| 4,818,825 A | | 4/1989 | Ishikawa et al. | |
| 5,191,180 A | * | 3/1993 | Kitamura et al. ............ | 218/135 |
| 5,898,149 A | * | 4/1999 | Berger et al. .................. | 218/60 |
| 5,902,980 A | * | 5/1999 | Reincke et al. .............. | 218/155 |
| 5,939,692 A | * | 8/1999 | Perret ........................... | 218/43 |
| 6,002,084 A | * | 12/1999 | Leijon et al. .............. | 174/21 R |
| 6,081,729 A | * | 6/2000 | Bauerschmidt et al. ...... | 455/523 |

FOREIGN PATENT DOCUMENTS

| | | |
|---|---|---|
| EP | 03222621 | 10/1991 |
| WO | 99/18582 | 4/1999 |
| WO | 00/62309 | 10/2000 |

* cited by examiner

*Primary Examiner*—Dean A. Reichard
*Assistant Examiner*—Adolfo Nino
(74) *Attorney, Agent, or Firm*—Burns, Doane, Swecker & Mathis, L.L.P.

(57) ABSTRACT

The invention relates to a post insulator (4) whose surface (41, 51) is geometrically configured, in at least one area (4a) between an inner conductor (2) and encapsulation (3) for a gas-insulated switchgear assembly (1) such that surface discharge paths (6b) are provided between the inner conductor (2) and the encapsulation (3) and have a subsection in the opposite direction to the bridging direction (7). In consequence, surface discharges (6a) can be diverted in the opposite direction to an original propagation direction (7), and come to rest by self-blocking. Exemplary embodiments relate to: an indentation (4b) which is concave and is open toward the inner conductor (2) and/or toward the encapsulation (3) and is formed between a cup shaped barrier (5) and the base body (40) of the post insulator (4); diversion of surface discharges (6a) through up to 180° for efficient self blocking; and adhesive bonding (45) of the barrier (5) on a conventional post insulator (4). The invention also relates to a gas-insulated switchgear assembly (1) or to a switchgear assembly module having such a post insulator (4) or partition insulator (4).

20 Claims, 1 Drawing Sheet

GIS POST INSULATOR WITH AN INTEGRATED BARRIER

This application claims priority under 35 U.S.C. §§119 and/or 365 to Appln No. 01811053.6 filed in Germany on Oct. 29, 2001; the entire content of which is hereby incorporated by reference.

TECHNICAL FIELD

The present invention relates to the field of electrical components and systems for electrical power transmission and distribution, and in particular to the field of gas-insulated switchgear assemblies.

PRIOR ART

The surface of an insulator body is a dielectric weak point of the insulator. Electrically conductive particles such as metal swarf, which are produced by way of example by erosion in disconnector circuits or by wear products from the conductor owing to thermal cycling and the movement resulting from it, have the tendency to adhere to the surface of the insulator, and to accumulate there, owing to the high dielectric constant of the insulator. Particles such as these lead to a considerably lower breakdown voltage, since the electric field around the particles is increased by the proximity of the insulator body.

WO 99/18582 discloses a gas-insulated or air insulated switchgear assembly of this generic type. In order to improve the breakdown strength, an inner conductor is provided with a dielectric layer and with transversely projecting barriers. The barriers are arranged on both sides of, and closely adjacent to, post insulators to which the inner conductor is fitted. They are used to prevent surface discharges, so-called streamers which occur on the dielectric insulation layer of the inner conductor, from reaching the post insulator and from flashing over via the post insulator to the grounded encapsulation or to an adjacent inner conductor. For this purpose, the barriers are designed with a geometry which tapers in the transverse direction, effectively in the form of a series of peaks without any overhanging parts, in order firstly to lengthen the path for the surface discharge, and secondly to achieve field control which is advantageous for the triple point at the contact point between the inner conductor and post insulator. This has the disadvantage that the lengthening of the path is often not sufficient to cause a surface discharge to break down. Furthermore, in this arrangement, surface discharges which originate on the post insulator, or move to it, cannot be stopped. Overall, the risk of dielectric flashovers resulting from surface discharges in the area of post insulators is still very high.

WO 00/62309 discloses a dielectric insulator for supporting a high voltage electrode on a holder, which is surrounded by a protective body, for example a porous foam, with a low dielectric constant. The protective body prevents metal swarf from being deposited directly on the insulator and, in particular, at the triple point.

DESCRIPTION OF THE INVENTION

The object of the present invention is to specify a post insulator for a gas-insulated switchgear assembly, a gas-insulated switchgear assembly, and a switchgear assembly module with a post insulator, which have an improved breakdown strength. According to the invention, this object is achieved by the features of the independent claims.

In a first aspect, the invention comprises a post insulator with a base body for supporting a high voltage component on a holder, with the post insulator being designed to bridge a high voltage potential difference between the component and the holder and having a surface, which extends essentially along a bridging direction, i.e. essentially along a potential gradient in the undisturbed operating state, of the base body, the surface of the post insulator having a cup-shaped indentation, which is concave and open toward the component or the holder, in an area between the component and the holder. The concave cup shape is used to divert surface discharges which originate from the component and propagate along the bridging direction in a direction opposite the bridging direction. The section which is in the opposite direction to the original propagation direction results in discharges being brought to rest and, possibly, being diverted laterally on the insulator surface. Overall, the invention effectively suppresses surface discharges along insulator surfaces on which there are particles and which are subject to a potential gradient. In consequence, systems, for example gas insulated switchgear assemblies (GIS), can be designed for higher E field strengths, greater particle contamination, and/or with more compact dimensions.

In one exemplary embodiment, the indentation has a macroscopic rearward section for self-blocking of surface discharges, for surface discharge paths between the component and the holder. This means that the reverse movement and possible diversion of surface discharges takes place over macroscopic dimensions, for example in the millimetric or centimetric range. In this case, the surface discharges are guided so that, on the rearward section, either their distance from the holder increases or their distance from the component decreases, if the indentation is concave and is open toward the component, or its distance from the holder decreases and its distance from the component increases, if the indentation is concave and is open toward the holder.

In a further exemplary embodiment, the surface discharge paths between the component and the holder can be diverted by means of the indentation from the bridging direction through an angle which is more than 90°, preferably 120° and particularly preferably 150° or especially 180°, and which lies essentially in a plane which is defined by a normal to the surface of the base body and by the bridging direction. The closer the diversion angle is to 180°, the more efficiently surface discharges can be stopped or diverted by self-blocking, thus avoiding flashovers to the holder.

The exemplary embodiments as claimed in claim 3 allow as many of the surface discharge paths as possible, and preferably all the surface discharge paths, between the component and the holder to be provided with rearward self-blocking sections by means of at least one indentation.

The exemplary embodiment as claimed in claim 4 has the advantage that the indentation is formed in a particularly suitable manner between the base body and the projection of the dielectric barrier. In particular, the barrier can be attached to the base body of a conventional post insulator.

The exemplary embodiment as claimed in claim 5 has the advantage that the barrier has a simple shape, and the barrier causes only minor E-field distortion on the surface of the post insulator.

The exemplary embodiment as claimed in claim 6 has the advantage that the post insulator with a barrier and indentation can be produced in a particularly simple manner by adhesive bonding or casting.

The exemplary embodiment as claimed in claim 7 has the advantage that the rounding of the barrier and of the indentation and their arrangement in a region of the insulator surface where the field is weak, and preferably where the field is at its weakest, reduces the E-field loads, and/or the physical dimensions of the switchgear assembly can be reduced further.

A second aspect of the invention relates to a gas insulated switchgear assembly or to a switchgear assembly module which has a post insulator according to the first aspect and according to the associated exemplary embodiments.

Further embodiments, advantages and applications of the invention can be found in the dependent claims as well as in the description which now follows, and in the figures.

BRIEF DESCRIPTION OF THE DRAWING

In the figures, of a post insulator according to the invention and of a gas-insulated switchgear assembly according to the invention.

Identical parts are provided with the same reference symbols in the figures.

APPROACHES TO IMPLEMENTATION OF THE INVENTION

Figure 1:
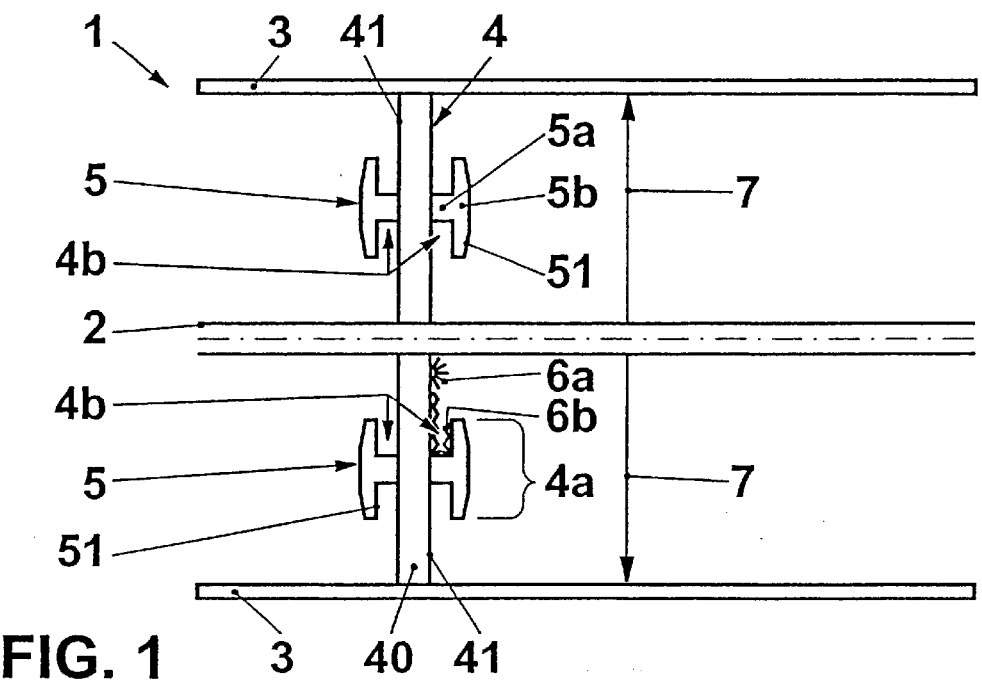
FIG. 1 shows a cross section of a post insulator according to the invention with an integrated dielectric T-shaped barrier.

FIG. 1 shows a gas-insulated switchgear assembly 1 (GIS) with a post insulator 4 which has a base body 40 for supporting an inner conductor 2 or, in general, having a high-voltage component 2 on GIS encapsulation 3 or ground 3 or, in general, a holder 3. The post insulator 4 is designed in terms of its geometric shape, in particular in terms of its surface shape, and its material, dielectrically such that it is suitable for bridging a high-voltage potential difference, or possibly a medium-voltage potential difference, between the component 2 and the holder 3. One surface 41 of the base body 40 extends essentially along a bridging direction 7, that is to say essentially along a potential gradient which occurs on the post insulator 4 during operation.

According to the invention, the surface 41, 51 of the post insulator 4 has a cup-shaped indentation 4b which is concave and open toward the component 2 or toward the holder 3, in an area 4a between the component 2 and the holder 3. The concave shape of the indentation 4b is used to allow a direction change for surface discharge paths 6b from the component 2 to the holder 3 or vice versa, so that the discharge 6a travels at least partially in the opposite direction to its original propagation direction. This is intended to apply at least to dielectrically critical paths 6b. The rearward path 6b results in self-blocking of the discharge 6a and prevents it from flashing over from the component 2 to the holder 3 or, conversely, from the holder 3 to the component 2. Exemplary embodiments are described in the following text.

The new geometry of the post insulator 4 results in a considerable dielectric improvement for an insulator surface 41, 51 which is weakened by metallic particles adhering to it. The indentation 4b prevents unconstrained initial growth of a discharge 6a which has been ignited, for example, by an overvoltage, and prevents the flashover associated with this. In consequence, the insulator 4 need no longer withstand all the dielectric loads that occur. Only overvoltages which occur rarely are critical at that time, particularly in the presence of particles. The indentation 4b means that surface discharges 6a during short term overvoltages can be tolerated, since they no longer lead to a breakdown. This advantage cannot be achieved just by a barrier without an indentation. Overvoltages such as these therefore no longer need to be taken into account for the dielectric design, and the overall switchgear assembly 1 can be constructed to be smaller, and hence at a lower cost.

In FIG. 1, the indentation 4b is implemented in such a way that a dielectric barrier 5 is mounted on the base body 40 of a conventional post insulator 4 and has a projection 5a, 5b with respect to the base body 40 of the post-insulator 4, and has an extent 5c transversely with respect to the bridging direction 7. The indentation 4b is then formed between the base body 40 and the barrier 5 of the post insulator 4. At least one indentation 4b is advantageously in each case arranged on a front surface 41 and on a rear surface 51 of the post insulator 4, and/or at least one indentation 4b, which is concave and open toward the component 2, and at least one indentation 4b, which is concave and is open toward the holder 3, are/is provided, and/or the indentation 4b and, in particular, the barrier 5 are closed in an annular shape around the component 2. This provides a rearward section for self-blocking of the discharge 6a for a number of surface discharge paths 6b, or for all the surface discharge paths 6b.

The barrier 5, which is shown by way of example, has a profile (FIG. 1) with an essentially T shaped cross section, or an L shaped profile (FIG. 2) 5a, 5b with a neck part 5a, which projects from the post insulator 4, and with a head part 5b, which extends essentially parallel to the surface 41 of the base body 40. The T profile 5a, 5b allows the additional indentations, which are concave and are open toward the holder 3, to be provided in a simple manner. This is particularly useful when the roles of the components 2 and of the holder 3 are interchangeable, for example when the risk of a flashover from the component 2 to the holder 3 and from the holder 3 to the component 2 is of similar magnitude, or if the component 2 is at the same time designed as the holder 3 and the holder 3 is at the same time designed as the component 2. This is the case, for example, when the post insulator 4 is arranged between two inner conductors of a three-phase gas insulated switchgear assembly, and the aim is to prevent flashovers resulting from surface discharges in both directions.

The projection 5a, 5b typically has a thickness which increases in a direction at right angles to the surface 41 of the base body 40, in order to provide the concave opening 4b. The dimensions of the barrier 5, in particular the height and thickness of the neck part 5a, the height and thickness of the head part 5b, and in particular a concave projection of the head part 5b over the neck part 5a, and a transverse extent 5c, are designed on the basis of the dielectric requirements for the respective voltage level, in particular as a function of the maximum permissible E field strength and of the maximum permissible contamination level of the insulator surface 41, 51.

Figure 2:
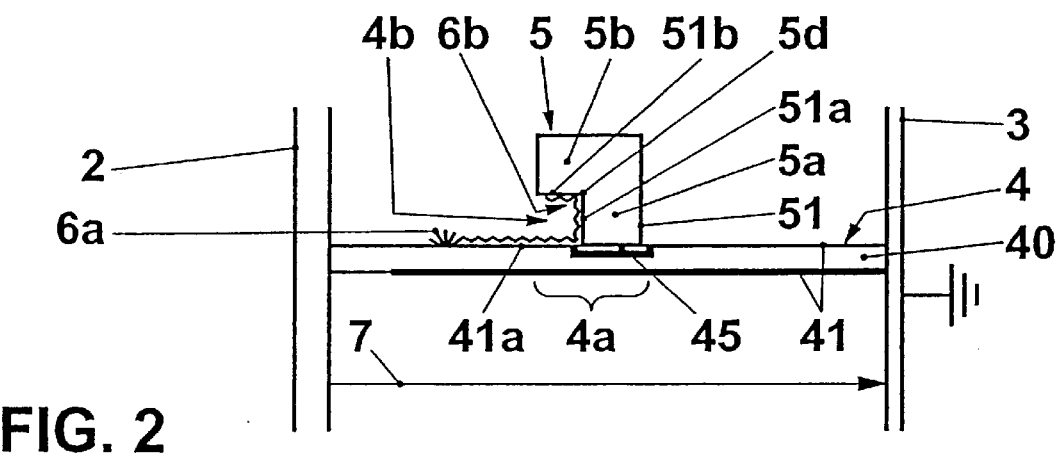
FIG. 2 shows across section of a post insulator according to the invention with an integrated dielectric L-shaped barrier.

FIG. 2 shows a detail view, in which the indentation 4b is bounded by a surface 41a of the base body 40 in the area 41a and by a surface 51a, 51b, which is adjacent to the base body 40, of the barrier 5, and the adjacent surface 51a, 51b of the barrier 5 has a surface element 51b parallel to the surface 41a of the base body 40, but at a distance from it, so that the surface 41a of the base body 40 and the adjacent surface 51, 51b form a concave indentation 4b with a J shaped or U shaped cross section.

The barrier 5 may be adhesively bonded to the base body 40 of the post insulator 4, in which case the adhesion surface 45 is intended to have dielectric breakdown strength, and possibly also a dielectric constant, which is or are comparable to that or those of the material of the post insulator 4. Alternatively, the barrier 5 may be integral with the base body 40 of the post insulator 4, for example being cast integrally with it. Known solid insulator materials, for example polyethylene, may be chosen as the material.

The area 4a for arrangement of the indentation 4b or of a barrier 5 between the component 2 and the holder 3 is preferably chosen to be in a region where the E field strengths on the surface 41, 51 of the post insulator 4 are low during normal operation. The post insulator 4 generally tapers radially outward and has surface areas in the tapering region where the field is weak or is at its weakest. In order to improve the field control, the indentation 4b, in particular an inner profile 5c of the indentation 4b, may have rounded contours.

The post insulator 4 is, for example, a partition insulator 4 or a gas-permeable post insulator 4. The post insulator 4 may be designed for a gas-insulated switchgear assembly 1, in particular for high voltage levels above 123 kV.

Figure 3:
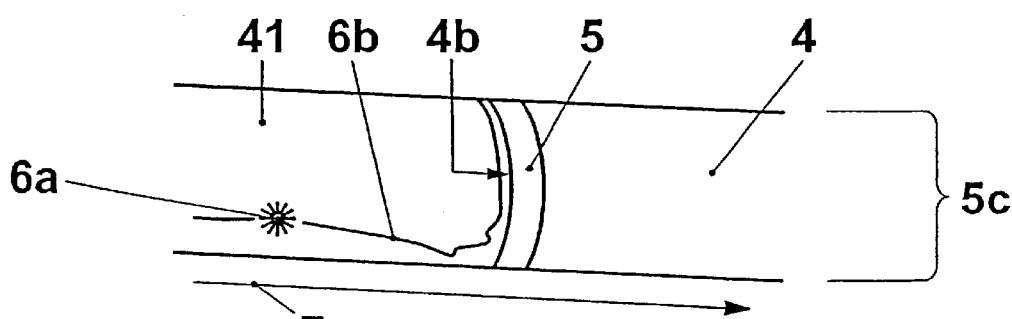
FIG. 3 shows an experimental verification (schematically) for the blocking of surface discharges by the barrier.

FIG. 3 shows a schematic photograph for experimental verification that a surface discharge 6a can be blocked by the barrier 5 or indentation 4b. A stepped high voltage is applied to a needle electrode. In consequence, a discharge 6a is started on the surface 41. The surface discharge 6a initially propagates on the post insulator 4 in the bridging direction 7, is blocked by the concave indentation profile 4b on the barrier 5 and, in the present case, is diverted in the lateral direction, that is to say along the transverse extent 5c of the barrier 5 or indentation 4b. The discharge path 6b does not include any discharge section through gas, but runs on surfaces 41, 51, 51a, 51b of the switchgear assembly 1 and, in particular, on insulator surfaces 41, 51, 51a, 51b which are subject to a strong potential gradient, typically between high voltage and ground or between different high voltage phases.

The invention also relates to a gas-insulated switchgear assembly 1 having a post insulator 4 as described above, and to a module (not illustrated) of a gas-insulated switchgear assembly 1 having such a post insulator 4. The module may be a prefabricated assembly which can be transported separately and which can be assembled together with other modules to form a gas insulated switchgear assembly 1.

LIST OF REFERENCE SYMBOLS

1 gas-insulated switchgear assembly (GIS) 2 inner conductor 3 encapsulation, ground 4 post insulator, partition insulator 4a area, barrier area 4b cup-shaped indentation 40 base body of the post insulator (without a barrier) 41 surface of the post insulator (without a barrier) 41a, 51a, 51b surface of the indentation 45 boundary surface, adhesive bond 5 barrier element 51, 51a, 51b surface of the barrier element 5a, 5b projection 5a neck 5b head 5c extent transversely with respect to the bridging direction 5d inner profile (rounded) 6a high-voltage needle 6b discharge path, surface discharge 7 bridging direction.

What is claimed is:

1. A post insulator having a base body for supporting a high voltage component on a holder, the post insulator being designed to bridge a high voltage potential difference between the component and the holder and having a surface which extends essentially along a bridging direction of the base body, wherein the surface of the post insulator has at least one cup-shaped indentation, which is concave and open toward the component or the holder, in an area between the component and the holder, wherein
   a) on its surface in the area, the post insulator has a dielectric barrier which has a projection with respect to the base body of the post insulator, and has an extent transversely with respect to the bridging direction, and
   b) the indentation is formed between the base body and the barrier of the post insulator.

2. The post insulator as claimed in claim 1, wherein
   a) the indentation has a macroscopic rearward section for self-blocking of surface discharges, for surface discharge paths between the component and the holder, or
   b) surface discharge paths between the component and the holder can be diverted by means of the indentation from the bridging direction through an angle greater than 90° which lies essentially in a plane which is defined by a normal to the surface of the base body and by the bridging direction.

3. The post insulator as claimed in claim 1, wherein
at least one of the at least one indentation is arranged on a front surface, and
at least another of the at least one indentation is arranged on a rear surface of the post insulator or
   c) at least one indentation is closed in an annular shape around the component.

4. The post insulator as claimed in claim 1, wherein
   a) the barrier has a profile with an essentially L shaped or T shaped cross section, with a neck part which projects from the post insulator, and with a head part which extends essentially parallel to the surface of the base body, or
   b) the barrier is closed in an annular shape around the component.

5. The post insulator as claimed in claim 1, wherein
   a) the barrier is adhesively bonded to the base body of the post insulator, and the adhesion surface has a dielectric breakdown strength which is comparable to that of the material of the post insulator, or
   b) the barrier is integral with the base body of the post insulator.

6. The post insulator as claimed in claim 1, wherein
   a) the area for arrangement of the indentation and in particular of a barrier between the component and the holder is chosen to be in an area where there are low E field strengths on the surface of the post insulator during normal operation, or
   b) the indentation, in particular an inner profile of the indentation, has rounded contours in order to improve the E field control.

7. The post insulator as claimed in claim 1, wherein
   a) the high voltage component is an inner conductor in a gas insulated switchgear assembly,
   b) the holder is encapsulation or a further inner conductor in a gas insulated switchgear assembly, or
   c) the component is at the same time designed as the holder, and the holder is at the same time designed as the component.

8. The post insulator as claimed in claim 1, wherein
   a) the post insulator is a partition insulator or a gas permeable post insulator, or
   b) the post insulator is designed for a gas insulated switchgear assembly, in particular for high-voltage levels above 123 kV.

9. A gas-insulated switchgear assembly having a post insulator as claimed in claim 1.

10. A module for a gas-insulated switchgear assembly having a post insulator as claimed in claim 1.

11. The post insulator as claimed in claim 1, wherein a first of the indentations is concave and open toward the component, and wherein a second of the indentations is concave and open toward the holder.

12. The post insulator as claimed in claim 1, wherein a) the indentation is in an area where there are low E field strengths on the surface of the post insulator during normal operation, or b) an inner profile of the indentation has rounded contours.

13. The post insulator as claimed in claim 1, wherein an area for arrangement of a barrier between the component and the holder is in an area where there are low E field strengths on the surface of the post insulator during normal operations.

14. The post insulator as claimed in claim 1, wherein the indentation has rounded contours.

15. The post insulator as claimed in claim 1, wherein the post insulator is a partition insulator.

16. The post insulator as claimed in claim 1, wherein the post insulator is a gas permeable post insulator.

17. The post insulator as claimed in claim 1, wherein the post insulator is for a gas insulated switchgear assembly for voltage levels above 123 kV.

18. The post insulator as claimed in claim 1, wherein surface discharge paths between the component and the holder can be diverted by means of the indentation from the bridging direction through an angle of at least 120° which lies essentially in a plane which is defined by a normal to the surface of the base body and by the bridging direction.

19. The post insulator as claimed in claim 1, wherein surface discharge paths between the component and the holder can be diverted by means of the indentation from the bridging direction through an angle of at least 150° which lies essentially in a plane which is defined by a normal to the surface of the base body and by the bridging direction.

20. The post insulator as claimed in claim 1, wherein surface discharge paths between the component and the holder can be diverted by means of the indentation from the bridging direction through an angle of at least 180° which lies essentially in a plane which is defined by a normal to the surface of the base body and by the bridging direction.

* * * * *